United States Patent Office 3,729,477
Patented Apr. 24, 1973

3,729,477
CERTAIN 4-(3-AMINO-2-HYDROXYPROPOXY)-1,2,5-THIADIAZOLE-3-CARBOXAMIDES
Burton Kendall Wasson, Valois, Quebec, Canada, assignor to Charles E. Frosst & Co., Kirkland, Quebec, Canada
No Drawing. Application Apr. 21, 1969, Ser. No. 818,090, which is a continuation-in-part of application Ser. No. 731,333, May 22, 1968. Divided and this application Sept. 9, 1971, Ser. No. 179,148
Int. Cl. C07d 91/68
U.S. Cl. 260—302 D          3 Claims

ABSTRACT OF THE DISCLOSURE

4 - [3 - (substituted amino) - 2 - hydroxypropoxy]-1,2,5-thiadiazole compounds, substituted in the 3-position of the thiadiazole nucleus exhibit β-adrenergic blocking properties and thus are useful in the management of angina pectoris are described. The products are prepared by reaction of 3-carboxy-4-allyloxy-1,2,5-thiadiazole with N-bromosuccinimide followed by esterification to give the alkyl ester of 3-carboxy-4-(3-bromo-2-hydroxypropoxy)-1,2,5-thiadiazole which upon treatment with an amine forms a 3-carbamoyl-4-(3-substituted amino-2-hydroxypropoxy)-1,2,5-thiadiazole.

---

This application is a division of my copending U.S. patent application, Ser. No. 818,090, filed Apr. 21, 1969 (now U.S. Pat. No. 3,657,237), which in turn was a continuation-in-part of U.S. Ser. No. 731,333, filed May 22, 1968 (now abandoned).

This invention is concerned with 4-[3-(substituted amino) - 2 - hydroxypropoxy] - 1,2,5 - thiadiazole compounds which are substituted in the 3-position of the thiadiazole nucleus. These compounds exhibit β-adrenergic blocking properties.

The novel β-adrenergic blocking agents of this invention have the structure

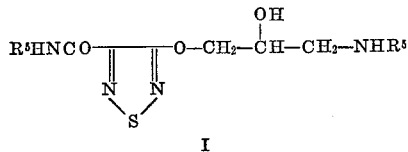

I and pharmacologically acceptable salts thereof, wherein $R^5$ is lower alkyl, having from 1 to 5 carbons.

Suitable pharmacologically acceptable salts of product I are acid addition salts derived from inorganic acids, for example, hydrochlorides, hydrobromides, phosphates or sulfates or salts derived from organic acids, for example, oxalates, lactates, malates, maleates, formates, acetates, succinates, tartrates, salicylates, citrates, phenylacetates, benzoates, p-toluenesulfonates and other salts such as those that provide relatively insoluble products that afford a slow release of the active material, for example, a 1,1'-methylene-bis(2-hydroxy-3-naphthoate) and the like.

The novel 4 - [3 - (substituted amino) - 2 - hydroxypropoxy]-1,2,5-thiadiazole compounds, structure I, as well as their intermediates which contain one asymmetric carbon atom in the propylene chain will be obtained as racemic compounds which can be separated into optically active isomers by known methods, for example, by forming a salt with an optically active acid, many of which are known to those skilled in the art, such as optically active tartaric, mandelic, cholic, O,O-di-p-toluoyl tartaric, O,O-dibenzoyl tartaric acids, or other acids conventionally employed for this purpose. Those novel products and intermediate compounds that contain two or more asymmetric carbons in the propylene chain will be obtained as diastereoisomers, and each diastereoisomer, of course, also will be obtained as a racemic compound which can be separated into its optically active isomers by known methods such as described above. Resolution of certain representative intermediate and end products will be described in the detailed examples. All products can be similarly resolved and the claims will be understood to embrace the products in the form of racemic compounds or diastereoisomers as well as in the form of the optically active isomers where appropriate.

The potential of a product as a β-adrenergic blocking agent conventionally is evaluated by the protocol which was employed to assess the β-blocking properties of the thiadiazole compounds of this invention. The protocol employed comprises intravenous administration of graded doses of the selected compound to rats which are then challenged with a standard dose of isoproterenol, a product known to be a β-stimulant. The $ED_{50}$ for representative products of this invention tested according to this protocol is included in the examples that follow.

The clinical application of β-adrenergic blocking agents are well known to physicians. One use for the novel products of this invention, which constitutes the best mode for use of the products known to applicant at this time, is for the control of tachycardia that may be drug induced (as by isoproterenol) or brought about by physiological conditions. In view of the considerable amount of literature that has accumulated concerning the use of β-adrenergic blocking agents, physicians would employ the products of this invention in any of the known conditions where a short-acting or long-acting agent is needed, such as in the management of angina pectoris.

The products can be prepared in pharmaceutical formulations suitable for oral or parenteral administration preferably in the form of tablets, solutions, suspensions and emulsions. The 1,2,5-thiadiazoles can be formulated in the form of the free base or in the form of their salts in conjunction or admixture with oragnic and/or inorganic solid or liquid pharmaceutical excipients. No special problems are involved in preparing suitable formulations of these products and methods generally employed for this purpose, which are known to those skilled in this art, are entirely suitable. If desired the compounds can be administered along with or formulated together with other active ingredients. Dosage units of from about 2 mg. to 10 mg. can be provided for the symptomatic adjustment of dosage by the physician deepnding upon the age and condition of the patient.

The novel thiadiazole products I of this invention can be prepared by the following route:

Reaction Scheme

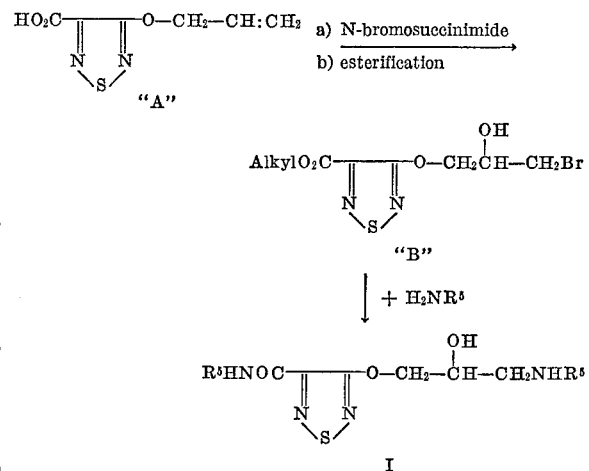

Treatment of the 4-allyloxy-1,2,5-thiadiazole-3-carboxylic acid "A" with N-bromosuccinimide followed by esterification gives the bromohydrin "B." An aqueous solution of N-bromosuccinimide advantageously is employed and reaction takes place at about ambient temperature. As the reaction is exothermic, the reaction mixture is cooled to maintain the temperature from slightly below to slightly above ambient temperature for best results. Esterification can be effected with any alcohol, advantageously methanol or other lower alkanols having advantageously from 1 to 4 carbons or a phenyl-lower alkanol such as, for example, phenylethanol, and the reaction temperature preferably is maintained at a range from below to slightly above ambient temperature, such as in the range from about 10 to 30° C. The bromohydrin "B" which is obtained in good yields, then is condensed with an amine of the structure $H_2NR^5$ to form the thiadiazole product I. The reaction with the amine advantageously is carried out at reflux or if desired it can be carried out under pressure at higher temperatures. The amine generally is used in excess for its solvent properties.

The following examples will illustrate representative products of this invention prepared by the above described procedure. The following examples are not to be considered as limiting the preparation of any particular compound to the method described in the example as the examples are provided solely to illustrate the best mode currently known to applicant for the preparation of the novel thiadiazoles of this invention.

EXAMPLE 1

3-n-tert-butylcarbamoyl-4-(3-tert-butylamino-
2-hydroxypropoxy)-1,2,5-thiadiazole Step A: 4-allyloxy-1,2,5-thiadiazole-3-carboxylic acid A mixture of 1 mole of 4-allyloxy-3-cyano-1,2,5-thiadiazole in 10 parts (volume/grams) of 80% ethanol containing 4 equivalents of sodium hydroxide per equivalent of the thiadiazole is refluxed for 2 hours. The ethanol is removed in vacuo and the remaining residue dissolved in a minimum amount of water and made acidic (pH 2) with hydrochloric acid. The precipitated 4-allyloxy-1,2,5-thiadiazole-3-carboxylic acid is removed filtration and washed with water to give a 90% yield of product, M.P. 138–139° C.

Step B: 4-(3-bromo-2-hydroxypropoxy)-1,2,5-thiadiazole-3-carboxylic acid

A mixture of 9.3 g. (50 millimoles) of 4-allyloxy-1,2,5-thiadiazole-3-carboxylic acid and 8.9 g. (50 millimoles) of N-bromosuccinimide is suspended in 50 ml. of water. The mixture initially turns brown and evolves heat but after one minute a colorless solution results. The white crystals that deposit upon cooling are collected, washed with water, and dried giving 8.0 g. (56.5%) of 4-(3-bromo - 2 - hydroxypropoxy) - 1,2,5 - thiadiazole-3-carboxylic acid. Recrystallization of the product from ethyl acetate affords the purified bromohydrin, M.P. 175.0–177.5° C.

Analysis.—Calculated for $C_6H_7BrN_2O_4S$ (percent): C, 25.45; H, 2.49; Br, 28.23; N, 9.89; S, 11.32. Found (percent): C, 25.29; H, 2.38; Br, 28.14; N, 9.79; S, 11.28.

Step C: 3-carbomethoxy-4-(3-bromo-2-hydroxypropoxy)-1,2,5-thiadiazole

To a solution of 5 ml. (excess) of acetyl chloride in 40 ml. of anhydrous methanol is added 5.66 g. (20 millimoles) of 4-(3-bromo-2-hydroxypropoxy)-1,2,5-thiadiazole-3-carboxylic acid and the suspension is stirred for eighteen hours at room temperature. The resulting solution is evaporated to dryness to afford a colorless oil whose infrared spectrum is consistent with the proposed structure of 3 - carbomethoxy-4-(3-bromo-2-hydroxypropoxy)-1,2,5-thiadiazole which is used without further purification in the following step.

Step D: 3-N-tert-butylcarbamoyl-4-(3-tert-butylamino-2-hydroxypropoxy)-1,2,5-thiadiazole A mixture of 1.49 g. (5 millimoles) of 3-carbomethoxy - 4 - (3 - bromo - 2 - hydroxypropoxy)-1,2,5-thiadiazole in 6 ml. (excess) of tert-butylamine is refluxed for ninety hours. Considerable tertiary butylamine hydrobromide is precipitated by the addition of 100 ml. of diethyl ether. The salt is collected and the filtrate concentrated to remove diethyl ether and excess tert-butylamine. The resulting oil is dissolved in chloroform and washed sparingly with water. The chloroform layer is evaporated to give an oil that is dissolved in a mixture of methanol-diethyl ether and treated with a stream of hydrogen chloride until precipitation is complete. The solvent and excess hydrogen chloride are removed in vacuo. The residual oil is dissolved in hot ethyl acetate and cooled to give 1.2 g. of crystals. Further recrystallization of the product from ethyl acetate-diethyl ether and then methanol-diethyl ether affords pure 3-N-tert-butylcarbamoyl-4-(3-tert-butylamino - 2-hydroxypropoxy)-1,2,5-thiadiazole hydrochloride, M.P. 145–147° C.

Analysis.—Calculated for $C_{14}H_{27}ClN_4O_3S$ (percent): Cl, 9.66; N, 15.27; S, 8.74. Found (percent): Cl, 9.69; N, 15.61; S, 8.75.

EXAMPLE 2

3-N-isopropylcarbamoyl-4-(3-isopropylamino-2-
hydroxypropoxy)-1,2,5-thiadiazole

A mixture of 1.49 g. (5 millimoles) of 3-carbomethoxy - 4 - (3 - bromo - 2 - hydroxypropoxy)-1,2,5-thiadiazole (prepared as described in Example 1, Step B) and 10 ml. of isopropylamine is refluxed and stirred for seven days. The excess isopropylamine is removed in vacuo, and the residue is dissolved in diethyl ether. The ethereal solution is washed with water, dried, and evaporated to give 0.4 g. of oil. The oil is dissolved in methanol-diethyl ether and treated with excess hydrogen chloride. Evaporation of the solvent and treatment of the residue with ethyl acetate-methanol-diethyl ether gives 0.4 g. of crystalline product. Recrystallization of the product from ethyl acetate-methanol-diethyl ether gives 3-N-isopropylcarbamoyl - 4 - (3 - isopropylamino-2-hydroxypropoxy)-1,2,5-thiadiazole hydrochloride, M.P. 96–99° C.

Analysis.—Calculated for $C_{12}H_{23}ClN_4O_3S$ (percent): Cl, 10.46; N, 16.53; S, 9.46. Found (percent): Cl, 10.46; N, 16.11; S, 9.25.

The invention further provides pharmaceutical compositions comprising, as active ingredient, at least one of the compounds according to the invention in association with a pharmaceutical carrier or excipient. The compounds may be presented in a form suitable for oral, rectal or parenteral administration. Thus, for example, compositions for oral administration may be solid or liquid and may take the form of capsules, tablets, coated tablets, suspensions, etc., such compositions comprising carriers or excipients conveniently used in the pharmaceutical art. Thus suitable tabletting excepients include lactose, potato and maize starches, talc, gelatine, stearic acid, magnesium stearate, polyvinyl pyrrolidone, or other known tabletting substances.

For parenteral administration, the carrier or excipient may be a sterile, parenterally acceptable liquid, e.g., pyrogen-free water or an aqueous solution of polyvinyl pyrrolidone, or a parenterally aceptable oil, e.g. arachis oil, contained in ampoules.

In compositions for rectal administration, the carrier may comprise a suppository base, e.g., cocoa butter or a glyceride.

Advantageously, the compositions may be be formulated as dosage units, each unit being adapted to supply a fixed dose of active ingredient. Tablets, coated tablets, capsules, ampoules and suppositories are examples of preferred dosage unit forms according to the invention. Each dosage unit adapted for oral administration may conveniently contain 1 to 20 mg., and preferably 2 to 10 mg., of the active ingredient; each dosage unit adapted for parenteral administration may conveniently contain 0.1 to 5 mg., and preferably 0.1 to 1 mg., of the active ingredient.

What is claimed is:

1. A compound selected from the group consisting of a 1,2,5-thiadiazole having the structure

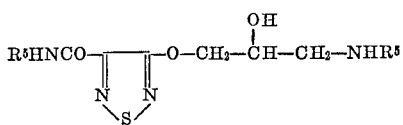

and a pharmacologically acceptable salt thereof wherein $R^5$ is $C_{1-5}$ algyl.

2. A compound selected from the group consisting of 3-N-tert-butylcarbamoyl - 4 - (3-tert-butylamino-2-hydroxypropoxy)-1,2,5-thiadiazole and a pharmacologically acceptable salt thereof.

3. A compound selected from the group consisting of 3-N-isopropylcarbamoyl - 4 - (3-isopropylamino-2-hydroxypropoxy)-1,2,5-thiadiazole and a pharmacologically acceptable salt thereof.

References Cited

UNITED STATES PATENTS 3,657,237  4/1972  Weinstock et al. ____ 260—302 D

ALEX MAZEL, Primary Examiner

R. J. GALLAGHER, Assistant Examiner